United States Patent [19]

Bellussi et al.

[11] Patent Number: 5,110,570
[45] Date of Patent: May 5, 1992

[54] PREPARATION OF CRYSTALLINE POROUS BORO-SILICATES

[75] Inventors: Giuseppe Bellussi, Piacenza; Angela Carati, San Giuliano Milanese; Fabrizio Cavani, Modena, all of Italy

[73] Assignees: Eniricerche S.p.A, Milan; Enichem Synthesis S.p.A., Palermo; Snamprogetti S.p.A., Milan, all of Italy

[21] Appl. No.: 627,635

[22] Filed: Dec. 14, 1990

[30] Foreign Application Priority Data

Dec. 21, 1989 [IT] Italy ................ 22795 A/89

[51] Int. Cl.$^5$ .............................................. C01B 35/12
[52] U.S. Cl. .................................. 423/277; 423/326; 423/328
[58] Field of Search ............... 423/328, 329, 326, 277, 423/279; 502/62, 77, 79

[56] References Cited

FOREIGN PATENT DOCUMENTS 877205 6/1978 Belgium .
55046 6/1982 European Pat. Off. .
172715 8/1985 European Pat. Off. .

OTHER PUBLICATIONS

Barrer, R. M. "Hydrothermal Chemistry of Zeolites", Academic Press (1982) pp. 137-140.

Primary Examiner—R. Bruce Breneman
Attorney, Agent, or Firm—Shea & Gould

[57] ABSTRACT

A novel method for preparing crystalline, porous boro-silicates and boron-metal-silicates isostructural with beta zeolite is disclosed.

This method makes it possible the times required by the synthesis of such zeolites to be reduced, and said preparations to be carried out with larger reaction volumes.

11 Claims, No Drawings

PREPARATION OF CRYSTALLINE POROUS BORO-SILICATES

The present invention relates to a novel method for preparing crystalline, porous boro-silicates and boron-metal-silicates isostructural with beta zeolite.

This method makes it possible the reaction times required by the synthesis of such zeolites to be reduced, and said syntheses to be carried out by operating with larger reaction volumes.

Beta zeolite was disclosed for the first time in U.S. Pat. No. 3,308,069. The boro-silicates having same structural characteristics are claimed in BE-877,205, and descriptions of boron-metal-silicates isostructural with beta zeolite are found, e.g., in EP-55,046 and EP-172,715. These materials have, in their anhydrous form, the following molar composition, with the components being expressed as oxides:

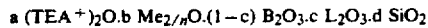

a $(TEA^+)_2O \cdot b\ Me_{2/n}O \cdot (1-c)\ B_2O_3 \cdot c\ L_2O_3 \cdot d\ SiO_2$ wherein:
$TEA^+$ = tetraethylammonium
$Me+H^+$, $NH_4^+$ or a metal cation having "n" valency
L = aluminum, gallium, iron, chrome, vanadium, molibdenum or manganese
a = 0.1 – 1
b = 0.1 – 1
c = 0 – 0.9
d = 4 – 1000.

These materials can be used in hydrodewaxing, hydrocracking, alkylation, isomerization reactions, and so forth.

Their synthesis requires, to obtain pure, single-phase crystalline products, rigorously static crystallization conditions: in fact, if the crystallization is carried out with stirring, the resulting product—as demonstrated by the Comparative Example N. 24 reported at the end of the instant disclosure—is not a zeolite, but a crystalline boro-silicate having a presumably compact structure.

These conditions of static crystallization do not make it possible large volumes of reaction to be handled at a time, to prevent the risk that the reaction mixture is heated in a non-uniform way. Moreover, the preparation of these boro-silicates and boron-metal-silicates requires rather long crystallization times, which are obviously undesired when one wishes to prepare such zeolites on a commercial scale.

The present Applicant found now that boro-silicates and boron-metal-silicates isostructural with beta zeolite can be prepared within shorter times than required by the processes known from the prior art, both under static conditions and with stirring.

Therefore, the subject-matter of the present invention is a method for synthetizing crystalline, porous boro-silicates and boron-metal-silicates, which method consists of preparing a suspension of crystallization seeds of the desired boro-silicate or boron-metal-silicate, adding said suspension to a mixture of reactants having the composition used in the prior art to prepare such zeolite and submitting the so obtained suspension to crystallization under hydrothermal conditions in an autoclave.

The crystallization may be indifferently carried out either under static conditions, or with stirring.

The suspension of crystallization seeds which is used in the instant process consists of a mixture having the same composition as of the reactant mixture used to prepare boro-silicates and boron-metal-silicates isostructural with beta zeolite, which is maintained under crystallization conditions for at least one day.

When the synthesis of boro-silicates and boron-metal-silicats is carried out according to the method of present invention, the times required by the crystallization are considerably shorter, and furthermore the reactant mixture can be stirred during said crystallization step, without said stirring causing undesired boro-silicates to be formed.

The boro-silicates and boron-metal-silicates obtained according to the method of the present invention show a crystallinity higher than 90%.

In particular, boron-aluminum-silicates having a crystallinity higher than 90% can be obtained even at values of $SiO_2/Al_2O_3$ ratios higher than 300.

The "crystallinity degree" of a zeolitic material is defined as the ratio of the integrated intensities of a certain number of reflexions in the X-ray diffraction pattern of the investigated material to those of the reference material, i.e., of the best crystallized product, taken as the standard (Chao K. J. et al., Chem. Soc. Faraday Trans. I 1981 77, 547).

The method according to the present invention consists of:

(1) preparing an "A" mixture containing a silica source, a boron source, the hydroxide of an alkali metal (MeOH), a tetraalkyl-ammonium ($R^+$) salt, distilled water and, optionally, a source of metal (L) selected from the group consisting of aluminum, iron, gallium, chrome, vanadium, molibdenum and manganese, such that the molar composition of the mixture, expressed as oxides, is the following:
$SiO_2/B_2O_3 > 1$,
$R/SiO_2 = 0.1 - 1.0$,
$Me/SiO_2 = 0.01 - 1.0$,
$H_2O/SiO_2 = 5 - 80$,
and, in the case of boron-metal-silicates,
$SiO_2/L_2O_3 > 10$
and heating such a mixture in an autoclave under hydrothermal conditions and under its autogenous pressure, at a temperature comprised within the range of from 90° C. to 160° C. for a time of not less than 1 day, (2) adding the mixture from above (1) step, in an amount comprised within the range of from 1 to 60% by weight and preferably comprised within the range of from 5 to 30%, to a fresh mixture "B" having the same composition as of the "A" mixture and heating the resulting "C" mixture in an autoclave, under hydrothermal conditions and under the mixture's autogenous pressure, at a temperature comprised within the range of from 90° C. to 160° C., under static conditions, or with stirring.

In particular, the stay time of the "A" mixture inside the autoclave, during the (1) step, is preferably comprised within the range of from 2 to 7 days, and, still more preferably, is comprised within the range of from 2 to 5 days.

At the end of the process the autoclave is emptied, the crystalline material is recovered by filtration, is washed with distilled water and is dried at 120° C. for several hours. The so obtained product can be calcined and ion-exchanged according to the processes known from the prior art.

The source of silica which can be used in the process according to the present invention can be selected from among colloidal silica, silica gel, sodium silicate, and so forth, and preferably is colloidal silica.

The boron source is selected from among boric acid, alkaline borates, trialkyl-borates, and preferably is boric acid.

As the organic template-forming agent, a tetra-alkyl-ammonium salt, preferably tetra-ethyl-ammonium hydroxide, is used.

The sources of Al, Fe, Ga, V, Cr, Mn and Mo metals is selected from among the group consisting of the corresponding soluble salts, such as, e.g., the nitrate, sulfate, halide salts of the corresponding metal.

The suspensions of crystal seeds used in the method according to the present invention are stable for an indefinitely long time, at room temperature, independently on the degree of crystallization of the seeds contained in them.

The process according to the present invention makes it possible the facility for the large-scale preparation of boro-silicates or boron-metal-silicates to be kept engaged for a number of days which is by far lower than as required by the synthesis carried out in the absence of seeds, according to the processes known from the prior art. In particular, said process can also be carried out according to a "cascade" method, which avoids the use of a non-productive equipment piece like the vessel inside which only crystal seeds are prepared.

This "cascade" method consists of drawing, from the (b) step of the "n-th" preparation an aliquot of the "$C_n$" reaction mixture after that said mixture has remained inside the large-scale crystallization facility for a time shorter than, or equal to, the necessary time to obtain the total crystallization, and using this aliquot to supply a successive "$B_{n+1}$" fresh mixture with crystallization seeds.

EXAMPLES 1-4

Preparation of Seeds of Boro-Silicate "Boralite B"

This boro-silicate is disclosed in BE-877,205.

12.0 g of NaOH and 25.5 g of boric acid are dissolved in 112.5 g of an aqueous solution of tetra-ethyl-ammonium hydroxide at 40% by weight. A clear solution is obtained, which is diluted with 120.0 g of distilled water and is added to 204 g of Ludox AS silica at 30% by weight of silica.

The so obtained suspension, having a pH value of 12.2, is kept stirred at room temperature for 4 hours, and then is subdivided into four portions. Each portion is charged to one autoclave and is allowed to crystallize under static conditions, under the system's autogenous pressure, at 150° C.

The autoclaves are cooled and from them the milky suspensions are discharged and are used as such to feed with crystallization seeds the reactant mixtures used to synthetize boralite B.

These four seed preparations differ from one another as regards the stay time inside the autoclave under crystallization conditions:

| Example N. | Crystallization time |
|---|---|
| 1 | 3 days |
| 2 | 4 days |
| 3 | 5 days |
| 4 | 7 days |

EXAMPLES 5-19

Effect of the Seeds on the Crystallization Speed of Boro-Silicate "Boralite B"

The suspensions of seeds prepared according to the Examples 1-4 are added in an amount of 15% by weight to a same number of mixtures, all having the following composition, and which have been previously kept at room temperature for about 4 hours:

112.5 g of TEA-OH at 40% of water
12.0 g of NaOH
25.5 g of $H_3BO_3$
120.0 g of distilled water
204 g of Ludox AS silica at 30% by weight After the addition of the seed suspensions, the resulting mixtures are charged to steel autoclaves to crystallize under static conditions, each mixture under its autogenous pressure, and at temperatures of 150° C.

In the following table, the results are reported, which are obtained after different crystallization times:

| Example N. | Seed type Example N. | Crystallization time (days) | Crystallinity (%) |
|---|---|---|---|
| 5 | — | 3 | 0 |
| 6 | — | 5 | 5 |
| 7 | — | 7 | 100 |
| 8 | 1 | 2 | 0 |
| 9 | 1 | 3 | 5 |
| 10 | 1 | 4 | 82 |
| 11 | 2 | 2 | 0 |
| 12 | 2 | 3 | 5 |
| 13 | 2 | 4 | 100 |
| 14 | 3 | 1 | 10 |
| 15 | 3 | 2 | 23 |
| 16 | 3 | 3 | 100 |
| 17 | 3 | 4 | 100 |
| 18 | 4 | 1 | 48 |
| 19 | 4 | 3 | 100 |

From the above table, the following considerations may be drawn:

The addition of seeds to the reactant mixture accelerates the crystallization of boralite B: in fact, when this zeolite is prepared in the absence of seeds, according to the methods known from the prior art, a time of stay inside the autoclave of at least 7 days is necessary to have a product with a crystallinity of 100%. If, on the contrary, the crystallization is carried out in the presence of seeds prepared as disclosed above, the necessary time for the crystallization to occur decreases down to 3-4 days.

The degree of crystallization of the seeds has an influence on the change in speed of crystallization of boralite B: in particular, the decrease in crystallization speed reaches its highest value when said seeds are partially crystallized (prepared according to Example 2) and this effect is retained in case of completely crystallized seeds (prepared according to Example 3).

EXAMPLES 17-22

Effect of the Amount of Seeds on the Speed of Crystallization of Boro-Silicalite "Boralite B"

Different amounts of suspension of seeds prepared according to Example 3 are added to mixtures kept stirred at room temperature for about 4 hours, and having the following composition:

32.1 g of TEA-OH at 40% of water
3.4 g of NaOH 6.4 g of H₃BO₃
34.3 g of distilled water
58.3 g of Ludox AS silica at 30% by weight After the addition of the seed suspensions, the resulting mixtures are charged to steel autoclaves to crystallize under static conditions, each mixture under its autogenous pressure, and at a temperature of 150° C.

In the following table, the results are reported, which are obtained as a function of the added amount of seed suspension:

| Example N. | Added seeds % | Crystallization time (days) | Crystallinity (%) |
|---|---|---|---|
| 17 | 20 | 2 | 97 |
| 18 | 10 | 3 | 98 |
| 19 | 6 | 3 | 50 |
| 20 | 6 | 4 | 100 |
| 21 | 5 | 3 | 0 |
| 22 | 5 | 4 | 5 |

The amount of seeds added to the starting mixture has an influence on the extent of the increase in the speed of crystallization of boralite B. In particular, one may observe that when the crystallization is carried out with 20% by weight of added seeds, the time required by the crystallization decreases down to 2 days.

EXAMPLES 23-24

Effects of the Seeds on the Preparation of Boro-Silicate Carried Out in a Stirred Autoclave 6.8 g of NaOH and 12.8 g of H₃BO₃ are dissolved in 64.2 g of an aqueous solution of tetra-ethyl-ammonium hydroxide at 40% by weight. The resulting solution is diluted with 68.8 g of water and to the so obtained solution 116.6 of Ludox AS silica at 30% by weight is added.

The so obtained suspension is subdivided into two portions, i.e., "A" and "B" portions. To the "A" portion, 21 g of seed suspension prepared according to Example 3 is added. Both mixtures are kept stirred for about 4 hours at room temperature, then are charged to steel autoclaves and are caused to crystallize 7 days at 150° C., under their autogenous pressure, with stirring.

At the end of this time, the resulting products are discharged, washed and dried.

The material obtained from the mixture admixed with seeds (Example 23) is a pure boralite B having the following composition:
$SiO_2 = 82.4\%$
$B_2O_3 = 6.8\%$ On the contrary, the material obtained from the mixture to which no seeds were added (Example 24) is an undesired boro-silicate presumably having a compact structure.

EXAMPLE 25

Preparation of Al-Boralite B

A suspension of seeds for the synthesis of Al-boralite B is prepared as follows.

4 g of NaOH and 8 g of H₃BO₃ are dissolved in 30 g of distilled water. 35 g of tetra-ethyl-ammonium hydroxide at 40% in water and 0.5 g of Al(NO₃)₃.9 H₂O previously dissolved in 10 g of water are added to the above solution. The so obtained end solution is added to 64 g of Ludox AS silica at 30% by weight.

An "A" mixture is obtained, which is kept at room temperature for about 4 hours, then is charged to an autoclave and is allowed to crystallize 5 days at 150° C., under static conditions and under its autogenous pressure.

26 g of suspension of seeds prepared in that way is added to 155 g of a mixture having the same composition as of "A" mixture.

After 3 days of crystallization at 150° C., with stirring, under the mixture's autogenous pressure, an aluminum-containing boralite B is obtained. At the chemical analysis, the product shows the following molar composition:
$SiO_2/Al_2O_3 = 470$
$SiO_2/B_2O_3 = 24$
crystallinity = 97%

EXAMPLE 26

Preparation of Al-Boralite B

A reactant mixture "A" is prepared as follows. 4 g of NaOH and 0.8 g of H₃BO₃ are dissolved in 30 g of distilled water and then a solution separately prepared by adding 4.1 g of Al(NO₃)₃.9 H₂O in 10 g of water to 35 g of tetra-ethyl-ammonium hydroxide at 40% by weight is added.

To the so obtained solution, 64 g of Ludox AS silica at 30% by weight is then added.

The "A" mixture prepared in that way is kept with stirring at room temperature for approximately 4 hours, then is charged to an autoclave and is allowed to crystallize 5 days at 150° C. under static conditions, and under its autogenous pressure.

A suspension of seeds of milky appearance is obtained. 26 g of this suspension is added to 155 g of a mixture having the same composition as of "A" mixture. The whole mixture is charged to crystallize at 150° C., under its autogenous pressure, with stirring, for a 3-day time. At the end of this time, a boralite B containing Al is obtained as the product.

At the chemical analysis, the product shows the following molar composition:
$SiO_2/B_2O_3 = 294$
$SiO_2/Al_2O_3 = 52$
crystallinity = 96%

EXAMPLE 27

PREPARATION OF AL-BORALITE B

A reactant mixture "A" is prepared by dissolving 0.8 g of NaOH and 0.4 g of NaAlO₂ and 3.7 g of H₃BO₃ in 65.5 g of tetra-ethyl-ammonium hydroxide at 14% by weight.

To the so obtained clear solution, 31.2 g of Ludox AS silica at 40% by weight is added.

The "A" mixture prepared in that way is charged to an autoclave and is allowed to crystallize 2 days at 150° C. under static conditions, and under its autogenous pressure.

A milky suspension of seeds is thus obtained. 24 g of this suspension is added to 130 g of a mixture having the same composition as of "A" mixture. The resulting suspension is charged to crystallize at 150° C., under its autogenous pressure, under static conditions. An Al-boralite B is obtained, which one day later shows a crystallinity of 73% and after 2 days shows a crystallinity of 100%.

The product shows the following molar composition:
$SiO_2/B_2O_3 = 30$
$SiO_2/Al_2O_3 = 86$

I claim:
1. Process for preparing crystalline, porous borosilicates or boron-metal-silicates isostructural with beta zeolites characterized by the following general formula:

$$a(TEA^+)_2O \cdot b\, Me_{2/n}O \cdot (1-c)B_2O_3 \cdot c\, L_2O_3 \cdot d\, SiO_2$$

wherein:
TEA$^+$ = tetraethylammonium
ME = H$^+$, NH$_4^+$ or a metal cation having "n" valency
L is selected from the group consisting of aluminum, gallium, iron, chromium, vanadium, molybdenum and manganese
a = 0.1–1
b = 0.1–1
c = 0–0.9
d = 4–1000
consisting of:
(a) preparing an "A" mixture containing a silica source, a boron source, the hydroxide of an alkali metal (MeOH), a tetra-alkylammonium (R$^+$) salt, distilled water and, in the particular case of boron-metal-silicates, a source of metal (L), such that the molar composition of the mixture, expressed as oxides, is the following:
$SiO_2/B_2O_3 > 1$,
$R^+/SiO_3 = 0.1–1.0$,
$Me/SiO_2 = 0.1–1.0$,
$H_2O/SiO_2 = 5–80$,
and, in the case of boron-metal-silicates, $SiO_2/L_2O_3 > 10$ and heating such a mixture in an autoclave under hydrothermal conditions and under its autogenous pressure, at a temperature within the range of from about 90° C. to about 160° C. for a time of not less than 1 day,
(b) adding the mixture obtained from the above (a) step, in an amount within the range of from about 1 to about 60% by weight, to a fresh mixture "B" having the same, or substantially the same, composition as of the "A" mixture and heating the resulting "C" mixture in an autoclave, under hydrothermal conditions and under the mixture's autogenous pressure, at a temperature within the range of from about 90° C. to about 160° C., under static conditions, or with stirring.

2. Process according to claim 1, in which the mixture obtained in above (a) step is added to the fresh "B" mixture in an amount within the range of from about 5 to about 30%.

3. Process according to claim 1, in which the metal in boron-metal-silicates is selected from the group consisting of Al, Fe, Ga, V, Cr, Mn and Mo.

4. Process according to claim 1, in which the source of silica is selected from the group consisting of colloidal silica, silica gel, sodium silicate, the boron source is selected from the group consisting of boric acid, alkaline borates, trialkyl-borates, the source of Al, Fe, Ga, V, Cr, Mn, and Mo metals is selected from among the corresponding soluble salts.

5. Process according to claim 1, in which the source of silica is colloidal silica.

6. Process according to claim 1, in which the source of boron is boric acid.

7. Process according to claim 1, in which the tetra-alkyl-ammonium salt is tetra-ethyl-ammonium hydroxide.

8. Process according to claim 1, in which the "A" mixture is heated in the autoclave for a time of from 2 to 7 days.

9. Process according to claim 5, in which the "A" mixture is heated in the autoclave for a time of from 2 to 5 days.

10. Process according to claim 1, carried out according to a "cascade" method, consisting of drawing, from the (b) step of the "n-th" preparation an aliquot of the "C$_n$" reaction mixture after that said mixture has remained inside the crystallization vessel of a large-scale facility for a time shorter than, or equal to, the necessary time to obtain the total crystallization, and using this aliquot to seed a successive "B$_{n+1}$" fresh mixture.

11. Process for preparing crystalline, porous borosilicates or boron-metal-silicates isostructural with beta zeolites characterized by the following general formula:

$$a(TEA^+)_2O \cdot b\, Me_{2/n}O \cdot (1-c)B_2O_3 \cdot c\, L_2O_3 \cdot d\, SiO_2$$

wherein:
TEA$^+$ = tetraethylammonium
ME = H$^+$, NH$_4^+$ or a metal cation having "n" valency
L is selected from the group consisting of aluminum, gallium, iron, chromium, vanadium, molybdenum and manganese
a = 0.1–1
b = 0.1–1
c = 0–0.9
d = 4–1000
consisting of:
(a) preparing an "A" mixture containing a silica source, a boron source, the hydroxide of an alkali metal (MeOH), a tetra-alkyl-ammonium (R$^+$) salt, distilled water and, in the particular case of boron-metal-silicates, a source of metal (L), such that the molar composition of the mixture, expressed as oxides, is the following:
$SiO_2/B_2O_3 > 1$,
$R^+/SiO_2 = 0.1–1.0$,
$Me/SiO_2 = 0.1–1.0$,
$H_2O/SiO_2 = 5–80$,
and, in the case of boron-metal-silicates, $SiO_2/L_2O_3 > 10$ and heating such a mixture in an autoclave under hydrothermal conditions and under its autogenous pressure, at a temperature within the range of from about 90° C. to about 160° C. for a time of not less than 1 day but shorter than necessary to achieve total crystallization,
(b) adding the mixture obtained from the above (a) step, in an amount within the range of from about 1 to about 60% by weight, to a fresh mixture "B" having the same, or substantially the same, composition as of the "A" mixture and heating the resulting "C" mixture in an autoclave, under hydrothermal conditions and under the mixture's autogenous pressure, at a temperature within the range of from about 90° C. to about 160° C., under static conditions, or with stirring.

* * * * *

UNITED STATES PATENT AND TRADEMARK OFFICE
CERTIFICATE OF CORRECTION

PATENT NO. : 5,110,570

DATED : May 5, 1992

INVENTOR(S) : Giuseppe Bellussi et al.

It is certified that error appears in the above-identified patent and that said Letters Patent is hereby corrected as shown below:

Column 7, line 28:
In Claim 1, the formula "$R^+/SiO_3 = 0.1-1.0$" should read as --$R^+/SiO_2 = 0.1-1.0$--.

Signed and Sealed this

Twenty-first Day of December, 1993

BRUCE LEHMAN

*Attest:*

*Attesting Officer*  *Commissioner of Patents and Trademarks*